US008474260B2

(12) United States Patent
Borissov et al.

(10) Patent No.: US 8,474,260 B2
(45) Date of Patent: Jul. 2, 2013

(54) SYSTEM AND METHOD FOR PRODUCING POWER FROM THERMAL ENERGY STORED IN A FLUID PRODUCED DURING HEAVY OIL EXTRACTION

(75) Inventors: Alexandre A. Borissov, Calgary (CA); Anatoly A. Borissov, Sugarland, TX (US)

(73) Assignee: Geotrend Power Inc., Calgary (CA)

( * ) Notice: Subject to any disclaimer, the term of this patent is extended or adjusted under 35 U.S.C. 154(b) by 962 days.

(21) Appl. No.: 12/457,378

(22) Filed: Jun. 9, 2009

(65) Prior Publication Data

US 2009/0301087 A1 Dec. 10, 2009

Related U.S. Application Data

(60) Provisional application No. 61/129,183, filed on Jun. 10, 2008.

(51) Int. Cl.
*F03G 7/00* (2006.01)

(52) U.S. Cl.
USPC ................................ 60/641.2; 60/651; 60/671

(58) Field of Classification Search
USPC .............................. 60/641.2–641.5, 651, 671
See application file for complete search history.

(56) References Cited

U.S. PATENT DOCUMENTS

| | | | | |
|---|---|---|---|---|
| 3,864,208 | A * | 2/1975 | Van Huisen | 376/276 |
| 4,060,988 | A * | 12/1977 | Arnold | 60/641.2 |
| 4,160,479 | A * | 7/1979 | Richardson et al. | 166/267 |
| 4,242,870 | A | 1/1981 | Searingen et al. | |
| 4,344,483 | A | 8/1982 | Fisher et al. | |
| 4,344,485 | A | 8/1982 | Butler | |
| 4,473,120 | A * | 9/1984 | Jennings | 208/426 |
| 4,512,155 | A * | 4/1985 | Sheinbaum | 60/641.2 |
| 4,738,111 | A | 4/1988 | Edwards | |
| 4,741,398 | A * | 5/1988 | Goldsberry | 166/266 |
| 5,413,175 | A | 5/1995 | Edmunds | |
| 6,142,758 | A | 11/2000 | Taggett | |
| 6,984,292 | B2 | 1/2006 | Kresnyak et al. | |
| 2003/0230086 | A1 * | 12/2003 | Brewington | 60/641.1 |
| 2007/0119175 | A1 | 5/2007 | Ruggieri et al. | |
| 2007/0193744 | A1 | 8/2007 | Bridges | |
| 2007/0261844 | A1 | 11/2007 | Cogliandro et al. | |

FOREIGN PATENT DOCUMENTS

| | | |
|---|---|---|
| CA | 1304287 | 6/1992 |
| EP | 1 205 708 | 5/2002 |

OTHER PUBLICATIONS

U.S. Geothermal Inc., "Raft River Project In-Depth", http://www.usgeothermal.com/RaftRiverProject.aspx Retrieved from internet on Mar. 31, 2008.

* cited by examiner

*Primary Examiner* — Hoang Nguyen
(74) *Attorney, Agent, or Firm* — Dowell & Dowell, P.C.

(57) ABSTRACT

A system and method is disclosed for generating power from thermal energy stored in a fluid extracted during the recovery of heavy oil. The method includes the steps of vaporizing a working fluid in a binary cycle using thermal energy stored in the extracted fluid, converting the vaporized working fluid total energy into mechanical power using a positive displacement expander, and condensing the vaporized working fluid back to a liquid phase.

20 Claims, 1 Drawing Sheet

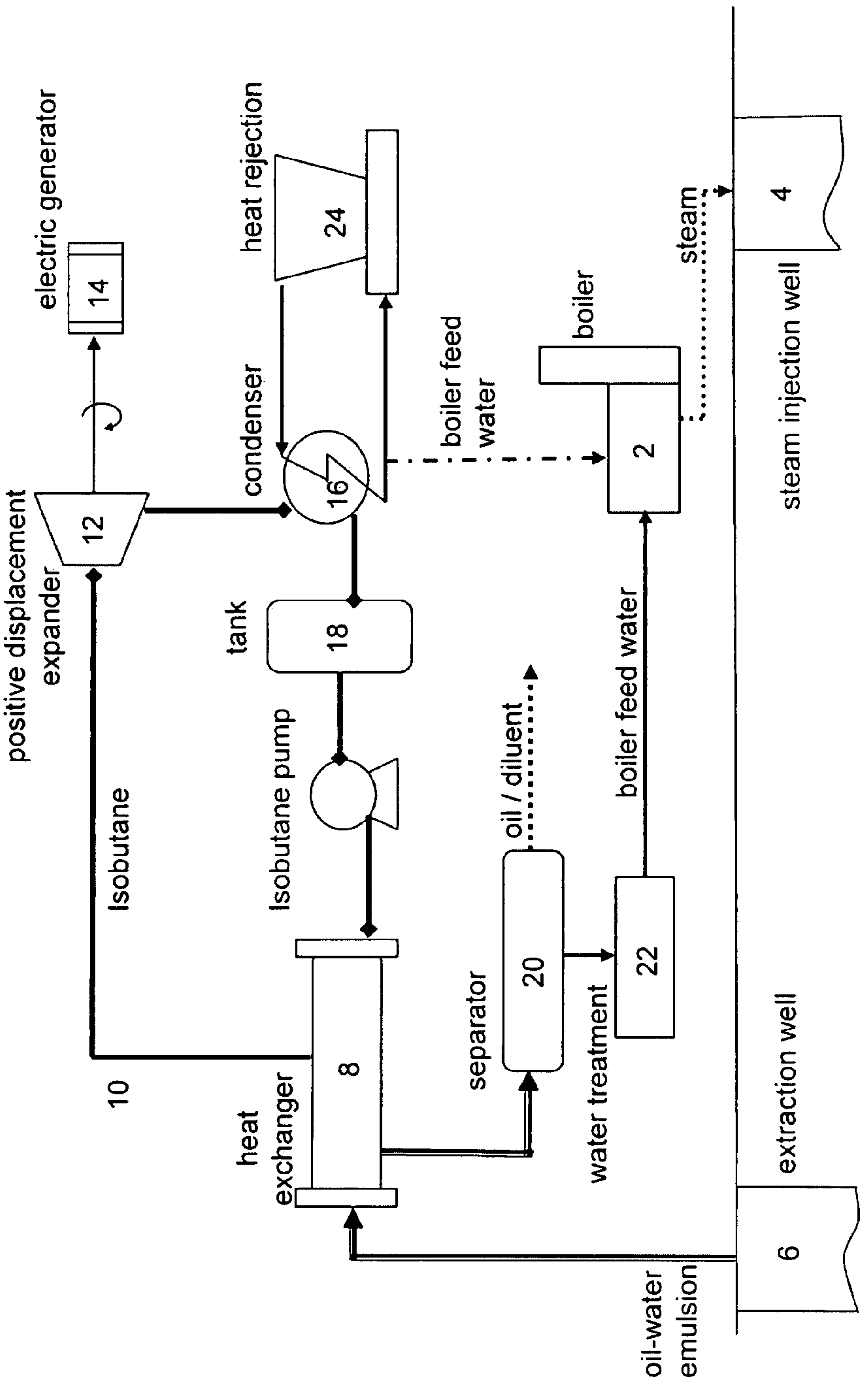
electric generator
14
positive displacement expander
12
heat rejection
24
condenser
16
boiler feed water
boiler
2
steam
4
steam injection well
tank
18
Isobutane pump
Isobutane
10
oil / diluent
boiler feed water
separator
20
22
water treatment
heat exchanger
8
extraction well
6
oil-water emulsion

SYSTEM AND METHOD FOR PRODUCING POWER FROM THERMAL ENERGY STORED IN A FLUID PRODUCED DURING HEAVY OIL EXTRACTION

This application claims priority from U.S. Application No. 61/129,183 filed Jun. 10, 2008, the contents of which are incorporated herein by reference.

FIELD OF THE INVENTION

The present invention relates to generating power from thermal energy stored in a fluid.

DESCRIPTION OF THE PRIOR ART

Heavy oil is a hydrocarbon material having a much higher viscosity than conventional petroleum crude. For this reason it is generally more difficult to recover heavy oil from a deposit. Consequently, methods and systems have been developed that are particularly suited to the difficulties encountered in such recovery. A technique common in the art is to heat the heavy oil in situ to reduce its viscosity. For example, high pressure and temperature steam may be injected into the reservoir through an injection well to preheat the heavy oil. The steam condenses to water and mixes with the heavy oil and forms a hot oil-water emulsion that has a reduced viscosity. This allows the oil or oil-water emulsion to rise to the surface naturally due to accumulated reservoir pressure, or to be economically pumped from the reservoir. Once on the surface of the earth, the recovered fluid is passed through a separator that separates out the heavy oil. Three methods of steam-assisted heavy oil recovery commonly used in the industry today are Steam Assisted Gravity Drainage (SAGD), Cyclic Steam Stimulation ("Huff and Puff" process), and Steam Flooding. In all three methods, large quantities of steam need to be pumped into the ground to deliver a sufficient amount of heat to reduce the viscosity of the heavy oil.

U.S. Pat. No. 4,344,485 to Butler proposes one method of steam-assisted heavy oil recovery in which there are drilled two wells to provide separate oil and water flow paths. In this design heat from the steam may be transferred to the heavy oil without substantial mixing to form an emulsion. The heat absorbed by the heavy oil reduces its viscosity sufficiently to enable the heavy oil to be economically extracted either as an emulsion or as oil at an elevated temperature.

Also, steam injection may not necessarily be employed to heat the heavy oil in situ. For example, U.S. Patent Application Publication No. 2007/0193744 to Bridges proposes heating the heavy oil using a wind powered electro-thermal in situ energy storage system.

In any case, the fluid extracted from the well during the recovery of heavy oil may consist of hot heavy oil, a hot oil-water emulsion, hot water, or hot gas. Although the thermal energy in this fluid provides a stable by-product of heat, the extracted fluid only has a moderately high temperature and is therefore generally not considered a high-grade heat source. However, the volume of the flow coming out of the well can be very high, for example up to a few thousand cubic meters per day.

Typically, recovered oil-water emulsion will have a temperature range between 150 and 330 degrees Celsius, a water/oil ratio of 1.5/1, and a mass flow of 165.6 kg/sec of hot fluid resulting in 36,000 barrels of neat oil per day. Therefore, even though the temperature of the extracted fluid is moderate, the high volume of flow results in a large quantity of heat exiting the ground. Currently, the extracted fluid is simply passed through a production cooler, and this heat is rejected to the atmosphere.

In U.S. Patent Application No. 2007/0261844 to Cogliandro et al., a system is proposed for the capture and sequestration of carbon dioxide. In Cogliandro's patent application, it is additionally suggested that thermal energy may be extracted from fluids recovered from the well in lieu of simply rejecting the heat to the atmosphere. Specifically, Cogliandro shows a system for applying thermal energy extracted from a fluid to convert water into steam and drive a steam turbine. Coliandro does not apply this system to recovering heavy oil, and in fact the system disclosed by Cogliandro could not function in a system for recovering heavy oil due to the moderate temperature of the extracted fluid. Cogliandro teaches the hot fluid entering the heat exchanger and converting water into steam to drive a steam turbine. This is a simple cycle process, and such a system requires the hot fluid extracted from the well to be a much higher temperature than available from a typical heavy oil-water emulsion. For example, the fluid would need to have a temperature of approximately 500 degrees Celsius or above to supply the high quality steam necessary to drive the turbine. Therefore, the system suggested by Cogliandro could only be used in applications where the fluid extracted from the well was a high temperature fluid flow. It could not be applied to a system for recovering heavy oil because it could not effectively recover the thermal energy present in the fluid extracted during heavy oil production.

It is an object of the present invention to obviate or mitigate at least some of the above disadvantages.

SUMMARY OF THE INVENTION

In one aspect of the invention, there is provided a method for generating power from thermal energy stored in a fluid extracted during the recovery of heavy oil comprising the steps of: (a) vaporizing a working fluid in a closed binary cycle using thermal energy stored in the extracted fluid; (b) converting the vaporized working fluid total energy into mechanical power using a positive displacement expander; and (c) condensing the vaporized working fluid back to a liquid phase.

In another aspect of the invention, there is provided a system for generating power from thermal energy stored in a fluid extracted during the recovery of heavy oil, the system comprising (a) a closed binary cycle having a working fluid; (b) a heat exchanger for receiving the extracted fluid and transferring a portion of the thermal energy to the working fluid, such that the working fluid is vaporized; (c) a positive displacement expander for receiving the vaporized working fluid and converting the working fluid total energy into mechanical power; (d) a condenser for converting vaporized working fluid exiting the positive displacement expander back to a liquid phase; and (e) a heat rejection unit for rejecting heat absorbed by the condenser.

In general terms, an embodiment of the present invention provides a system and method for generating power using the thermal energy stored in a fluid produced during heavy oil extraction. It has been recognized that the thermal energy stored in such a fluid can be economically harnessed to generate electricity by using a binary cycle with a suitable working fluid, and by using a positive displacement expander to receive the working fluid and drive an electric generator. The use of a binary cycle over a simple cycle process employing water, as well as the use of a positive displacement expander, allows electricity to be economically and efficiently generated from the extracted fluid, which only has a moderately high temperature (e.g., 150 to 330 degrees Celsius) and has traditionally been rejected to the atmosphere. This electricity production comes at little expense since the infrastructure for recovering heavy oil is already in place, which includes infrastructure that can easily be adapted for selling the electrical power back to the grid or for utilizing it in on-site technological processes. Therefore, the only investment in additional infrastructure needed is the binary cycle system used to produce the electric power from the extracted fluid.

In one embodiment, water separated from an extracted oil-water emulsion is treated and used as pre-heated boiler feedwater in a steam-assisted heavy oil recovery system. Such an embodiment results in a closed loop system for both the working fluid and for the water used in the heavy oil recovery. Additional boiler feedwater can be added, if necessary, by diverting a fraction of cooling water after use in a condenser in the binary cycle. Since this cooling water will have absorbed heat from the working fluid in the binary cycle, it will also be pre-heated.

BRIEF DESCRIPTION OF THE DRAWINGS

An exemplary embodiment of the invention will now be described by way of example only with reference to the accompanying drawing, in which:

FIG. 1 is a block diagram of a system for producing power from the thermal energy stored in a fluid produced during heavy oil extraction.

DETAILED DESCRIPTION OF THE INVENTION

FIG. 1 shows an embodiment of the invention applied to a system for extracting heavy oil using steam injection to reduce the viscosity of the oil. Typically, in such a system the extracted fluid will comprise an oil-water emulsion, but it may also comprise oil at an elevated temperature. In the embodiment described below, the fluid extracted from the well will be assumed to be an oil-water emulsion.

A boiler 2 heats water to form steam, which is injected into steam injection well 4. Oil-water emulsion pumped from extraction well 6 passes through a first path or loop of heat exchanger 8. Heat is extracted from the oil-water emulsion by the use of a binary cycle 10 with a suitable working fluid. The working fluid moves through a second path or loop of the heat exchanger 10 and heat is transferred from the emulsion in the first path to the working fluid in the second path. The working fluid is chosen to have a low boiling point such that it will be substantially or completely vaporized by the heat transferred from the extracted fluid in the first path. The working fluid will be vaporized, but it still may contain traces of liquid phase in the form of small droplets due to the relatively moderate temperature of the extracted fluid. A preferable working fluid is Isobutane; however, other working fluids that provide equivalent functionality may be used, for example, mixtures of Isobutane and Methane, Ammonia, and others.

The vaporized working fluid is fed to a positive displacement expander 12. The expander 12 may be, for example, of the screw or sliding vane type. For example, the expander may consist of a cylindrical rotor (not shown), which may have a number of sliding vanes (typically 6 to 8) eccentrically located in another cylindrical housing (not shown). Admission of vapour takes place when the volume between adjacent vanes is smallest, right after the intake port is closed. As the vapour expands, it spins a rotor and the volume between adjacent vanes increases. The expansion ratio for such an expander is defined as the ratio of the maximum volume between adjacent vanes (i.e., when the exhaust port opens) to the minimum volume between adjacent vanes (i.e., right after the intake port closes). A positive displacement expander 12 has a number of advantages over a turbine. For example, it provides much higher efficiency than a turbine over a broad range of operating conditions.

The expander 12 is connected to an electric generator 14 for the production of electricity. A condenser 16 uses a cooling fluid, such as water, to condense working fluid exiting expander 12 back to a liquid state. The cooling fluid of the condenser 16 passes through a heat rejection unit 24, such as a water cooling tower, to absorb heat from the cooling fluid. The working fluid in the binary cycle 10 after being condensed back to a liquid state is stored in tank 18 for re-use.

Oil-water emulsion exiting heat exchanger 8 enters separator 20, which separates the oil from the water. The water is passed through a treatment plant 22, which includes adding additional feedwater if necessary, and is returned to the boiler 2 to be converted into steam for injection into steam injection well 4. Conveniently, the water separated from the emulsion and returned to boiler 2 is still at an elevated temperature. This provides further energy savings because the boiler water is effectively pre-heated, which means less external energy is required to convert the boiler water into steam. In an alternative embodiment, additional feedwater can be added, if necessary, by diverting a fraction of cooling water after use in condenser 16 (as indicated in the chain-dotted line of FIG. 1). Since this cooling water will have absorbed heat from the working fluid in binary cycle 10, it will also be of an elevated temperature.

In operation, high-quality steam (e.g., up to 80% steam at a pressure of 12 Megapascals and temperature 327 degrees Celsius) is generated in boiler 2 and is injected into steam injection well 4, typically for approximately 60-90 days. During this time the heavy oil slowly heats and becomes less viscous. As heat from the steam is transferred to the heavy oil, the steam penetrates through fractures in the reservoir, it condenses, and the heavy oil and condensed steam mix to form an oil-water emulsion. Water may also be naturally trapped in the oil-saturated sands and may become free and form part of the emulsion as the heavy oil softens. As steam injection continues, and the emulsion continues to raise in temperature, it will become less and less viscous until its viscosity is sufficiently reduced to be economically pumped from extraction well 6 at the desired rate. As mentioned above, the oil-water emulsion typically has a temperature of between 150 to 330 degrees Celsius. The oil-water emulsion passes through heat exchanger 8 where the heat from the emulsion is transferred to the binary working fluid operating in the closed loop binary cycle 10.

After vaporization in heat exchanger 8, the working fluid flows into the high pressure chamber of the positive displacement expander 12 and expands to produce mechanical energy. The mechanical energy drives a shaft, which is connected to an electric generator 14 to produce electricity.

Depending on the properties of the working fluid, the vapour produced may not be of particularly high quality. Therefore, in some instances, the fluid entering the expander 12 may consist of fluid partially in liquid phase in the form of small liquid droplets. However, it will be appreciated that the working fluid chosen will be such that the fluid is completely or substantially vaporized by the heat from the extracted fluid, and that the use of the positive displacement expander 12 allows useful work to be extracted without jeopardizing the operation of the expander, even when complete vaporization is not achieved.

Additionally, if desired, the amount of heat transferred to the working fluid may be regulated so that the state of the working fluid is at or near the thermodynamic critical point. For example, this may be achieved by supplying additional heat to the working fluid using an external heat source (not shown) or by adjusting the flow rate of the working fluid. The advantage of such an arrangement is that heat energy from the emulsion is more efficiently transferred to working fluid vapour energy. This is because as the working fluid approaches its critical point, the heat of vaporization approaches zero. Therefore, heat energy transferred from the emulsion directly converts the working fluid to vapour. Expansion of the vapour will occur along the critical isotherm.

The use of the positive displacement expander 12 is advantageous because a positive displacement expander is well suited to relatively low quality vapour, which may sometimes be produced in binary cycle 10. A positive displacement expander 12 works efficiently with two-phase fluid (vapour and droplets of liquid), and in fact the liquid phase works as a lubricant and seal. A positive displacement expander 12 may also provide only single stage expansion for a very high expansion ratio number (e.g. up to 10), and its relatively low RPM allows it to be coupled directly to electric generator 14 without reduction gearing. Also, for these reasons and others, a positive displacement expander 12 requires relatively little maintenance.

After exiting expander 12, the working fluid, which is likely in both vapour and liquid phases, is condensed back to liquid phase using condenser 16, and is stored in tank 18 for re-use in the binary cycle 10. The condenser 16 uses a cooling fluid, such as water, which passes through a heat rejection unit 24, such as a water cooling tower, to absorb heat from the cooling fluid after use in condenser 16.

Meanwhile, the oil-water emulsion, after passing through heat exchanger 8, is fed to separator 20, which separates the heavy oil from the water. The water is treated 22, which includes adding makeup feedwater if necessary.

In the embodiment shown in FIG. 1, the separated water from separator 20 is returned to the boiler 2 for re-use. This provides further energy savings because the separated water is still at an elevated temperature, and therefore the boiler feedwater is effectively pre-heated. This means less external energy is required to convert the boiler water into steam. As shown in the chain-dotted line of FIG. 1, if additional boiler feedwater needs to be added, this can be supplied by diverting a fraction of cooling water after use in condenser 16. Whilst additional feedwater may be supplied using any external source of water, using cooling water exiting condenser 16 results in further energy savings since this cooling water will have absorbed heat from the working fluid in binary cycle 10 and will therefore also be of an elevated temperature.

EXAMPLE

As an example, an operational analysis of the embodiment of the invention as shown in FIG. 1 has been prepared for oil production of 36,000 barrels per day (or 66.2 kg/s) with a water-oil ratio of 1.5/1. Therefore, the water rate is 54,000 barrels per day (or 99.4 kg/s). To remain conservative the temperature of the oil-water emulsion is assumed only to be 150 degrees Celsius. Such parameters result in the total volume of oil-water emulsion to be 90.000 barrels per day, which is equivalent to a mass flow of 165.6 kg/s. The oil-water emulsion is cooled to 48.8 degrees Celsius in heat exchanger 8. At this temperature, the emulsion still has a viscosity that allows it to be pumped and delivered through a pipeline to a central processing facility. The total amount of power available will be 50 Megawatts. To absorb this power, the working fluid in binary cycle 10 will need to enter the heat exchanger at a flow rate of 119 kg/s and at an incoming temperature of 38.3 degrees Celsius (liquid phase). The temperature of the working fluid exiting heat exchanger 8 will be 115.5 degrees Celsius (vapour phase). The vaporized working fluid flows into expander 12, which has an expansion ration of 7.29. As a result of the expansion and conversion of heat energy to mechanical energy, the temperature of the working fluid exiting expander 12 will be 53 degrees Celsius. The working fluid enters condenser 16, and is further cooled back down to 38.3 degrees Celsius. With the cooling water at a temperature of 23 degrees Celsius entering condenser 16 at 988 kg/s from heat rejection unit 24, 43 Megawatts of power is absorbed, raising the temperature of the cooling water to 35 degrees Celsius. The water from condenser 16 at 35 degrees Celsius is then returned to heat rejection unit 24 for further cooling to a temperature of 23 degrees Celsius. If makeup feedwater needs to be added to the boiler, this can be supplied by diverting a fraction of the water at 35 degrees Celsius exiting condenser 16.

In the above scenario, the amount of net electric power produced is 7 Megawatts, and the total power extracted from the fluid is 50 Megawatts. The estimated power to produce the steam for injection is 414 Megawatts, which can be achieved by burning 33229 kg/hour of natural gas with 53 Megajouls/kg of calorific value. Therefore, the incremental in efficiency of energy recovery is approximately equal to 12% (i.e., 50/414). This is equivalent to saving approximately 4149 kg/hr of natural gas. Taking into consideration the high efficiency of the expander 12, the heat exchanger 8, and the condenser 16, as well as the full use of the heated water, minus the parasitic power consumption for pumps and valves, the total efficiency of the preferred embodiment as applied to the scenario described above is approximately 90%.

Although the invention has been described with reference to certain specific embodiments, various modifications thereof will be apparent to those skilled in the art without departing from the spirit and scope of the invention as outlined in the claims appended hereto.

For example, the invention need not be limited to systems that recover heavy oil using steam assisted recovery methods (e.g. gravity drainage, cyclic steam stimulation, or steam flooding). The invention can be applied to any system in which heavy oil is preheated in situ prior to extraction. This includes, for example, systems that use electromagnetic or electro-thermal methods or fire flooding for heating the heavy oil in situ. In systems that do not employ steam injection, the separator 20 may or may not be necessary, depending on whether the oil forms an emulsion with water naturally trapped in the deposit. Additionally, depending on the technological process employed in the oil extraction, in an alternative embodiment the oil-water emulsion may not be separated in separator 20. Instead a diluent may be added to the cooled oil-water emulsion, and the diluted emulsion may then be transported to a processing facility.

It will be appreciated that the fluid extracted from the well will not necessarily be an oil-water emulsion. For example, it may be heated heavy oil, hot water, or hot gas. The invention is applicable to any fluid extracted during the recovery of heavy oil. Finally, the positive displacement expander 12 need not necessarily drive an electric generator 14. The mechanical energy created by the positive displacement expander 12 may be used in any manner envisioned by the operator.

What is claimed is:

1. A method for generating power from thermal energy stored in a heavy oil-water emulsion extracted during the recovery of heavy oil comprising the steps of:

(a) vaporizing a working fluid in a closed binary cycle using thermal energy stored in the emulsion;

(b) converting said vaporized working fluid total energy into mechanical power using a positive displacement expander;

(c) condensing said vaporized working fluid back to a liquid phase;

(d) separating the water from said oil-water emulsion; and (e) using said separated water as boiler feedwater for producing steam.

2. The method of claim 1 further comprising the step of supplying additional water to said boiler feedwater, wherein said additional water comprises cooling fluid after use in said condensing.

3. The method of claim 1 further comprising the step of driving an electric generator using said mechanical power.

4. The method of claim 1 wherein said binary cycle working fluid is selected from the group consisting of: Isobutane, Ammonia, and a mixture of Isobutane and Methane.

5. The method of claim 1 wherein said positive displacement expander is selected from the group consisting of: a sliding vane expander, a screw expander, and a piston inside of a cylinder.

6. The method of claim 1 wherein said working fluid is heated to or near its critical point prior to said vaporizing.

7. A system for generating power from thermal energy stored in a heavy oil-water emulsion extracted during the recovery of heavy oil, said system comprising:

(a) a closed binary cycle having a working fluid;

(b) a heat exchanger for receiving said emulsion and transferring a portion of said thermal energy to said working fluid, such that the working fluid is vaporized;

(c) a positive displacement expander for receiving said vaporized working fluid and converting said working fluid total energy into mechanical power;

(d) a condenser for converting vaporized working fluid exiting said positive displacement expander back to a liquid phase;

(e) a heat rejection unit for rejecting heat absorbed by said condenser; and (f) an oil-water separator for separating the water from said oil-water emulsion, wherein said separated water is used as boiler feedwater.

8. The system of claim 7 wherein a portion of cooling water after use in said condenser is added to said boiler feedwater.

9. The system of claim 7 wherein said mechanical power is used to generate electricity.

10. The system of claim 7 wherein said binary cycle working fluid is selected from the group consisting of: Isobutane, Ammonia, and a mixture of Isobutane and Methane.

11. The system of claim 7 wherein said positive displacement expander is selected from the group consisting of: a sliding vane expander, a screw expander, and a piston inside of a cylinder.

12. The system of claim 7 wherein said working fluid is heated to or near its critical point prior to said vaporizing.

13. A method for generating power from thermal energy stored in heavy oil during recovery of heavy oil from a deposit, comprising the steps of:

(a) elevating the temperature of the heavy oil in the deposit by injecting steam into said deposit from an external source and heat the heavy oil in situ;

(b) extracting said heavy oil from the deposit as a heavy oil-water emulsion;

(c) transferring heat from said heavy oil to a working fluid in a closed binary cycle to vaporise working fluid using thermal energy stored in the extracted heavy oil;

(d) converting said vaporized working fluid total energy into mechanical power using a positive displacement expander;

(e) condensing said vaporized working fluid back to a liquid phase; and (f) passing said heavy oil for further processing.

14. The method of claim 13 further comprising the steps of:

(g) separating the water from said oil-water emulsion;

(h) using said separated water as boiler feedwater for producing steam; and (i) injecting said steam in to said deposit.

15. The method of claim 14 further comprising the step of supplying additional water to said boiler feedwater, wherein said additional water comprises cooing fluid after use in said condensing.

16. The method of claim 13 wherein said heavy oil-water emulsion is heated to between 150° C. and 330° C.

17. A system for generating power from thermal energy stored in heavy oil during the recovery of heavy oil, said system comprising:

(a) a source of steam to heat said deposit in situ;

(b) a well to extract said heavy oil from said deposit as a heavy oil-water emulsion;

(c) a closed binary cycle having a working fluid;

(d) a heat exchanger for receiving said heavy oil-water emulsion and transferring a portion of said thermal energy to said working fluid, such that the working fluid is vaporized;

(e) a positive displacement expander for receiving said vaporized working fluid and converting said working fluid total energy into mechanical power;

(f) a condenser for converting vaporized working fluid exiting said positive displacement expander back to a liquid phase; and (g) a heat rejection unit for rejecting heat absorbed by said condenser.

18. The system of claim 17 further comprising an oil-water separator for separating the water from said oil-water emulsion, and a boiler to produce steam and wherein said separated water is used as boiler feedwater.

19. The system of claim 18 wherein a portion of cooling water after use in said condenser is added to said boiler feedwater.

20. The system of claim 18 including an injection well connected to said boiler to inject steam produced by said boiler in to said deposit.

* * * * *